United States Patent
Wachsman et al.

(10) Patent No.: US 10,276,892 B2
(45) Date of Patent: Apr. 30, 2019

(54) HIGH CONDUCTIVITY NASICON ELECTROLYTE FOR ROOM TEMPERATURE SOLID-STATE SODIUM ION BATTERIES

(71) Applicant: University of Maryland, College Park, College Park, MD (US)

(72) Inventors: Eric D. Wachsman, Fulton, MD (US); Gregory Thomas Hitz, Potomac, MD (US); Kang Taek Lee, Greenbelt, MD (US)

(73) Assignee: University of Maryland, College Park, MD (US)

( * ) Notice: Subject to any disclaimer, the term of this patent is extended or adjusted under 35 U.S.C. 154(b) by 39 days.

(21) Appl. No.: 14/430,453

(22) PCT Filed: Sep. 25, 2013

(86) PCT No.: PCT/US2013/061660
§ 371 (c)(1),
(2) Date: Jun. 24, 2015

(87) PCT Pub. No.: WO2014/052439
PCT Pub. Date: Apr. 3, 2014

(65) Prior Publication Data
US 2015/0249262 A1 Sep. 3, 2015

Related U.S. Application Data
(60) Provisional application No. 61/705,352, filed on Sep. 25, 2012.

(51) Int. Cl.
H01M 10/0562 (2010.01)
H01M 10/0561 (2010.01)
(Continued)

(52) U.S. Cl.
CPC ......... *H01M 10/0562* (2013.01); *C01B 25/45* (2013.01); *H01M 10/054* (2013.01);
(Continued)

(58) Field of Classification Search
None
See application file for complete search history.

(56) References Cited

U.S. PATENT DOCUMENTS 4,512,905 A 4/1985 Clearfield et al.
4,582,621 A 4/1986 Bell et al.
(Continued)

OTHER PUBLICATIONS

Lin et al, Phase Relationship Electrical Conductivity and Crystal Chemistry of Na3+xZr2—xYbxSi2PO12 System, 40/41 Solid St Ionics 59-62 (1990).*
(Continued)

*Primary Examiner* — Yoshitoshi Takeuchi
(74) *Attorney, Agent, or Firm* — Sterne, Kessler, Goldstein & Fox P.L.L.C.

(57) ABSTRACT

Solid electrolytes compositions, methods of making the solid electrolytes, and methods of using the solid electrolytes in batteries and other electrochemical technologies are disclosed. The method of producing a solid electrolyte comprises (a) ball milling $Na_2CO_3$, $SiO_2$, $NH_4H_2PO_4$, a zirconium source, and a dopant to produce a ball milled powder; (b) calcining the ball milled powder to produce a calcined powder; and (c) sintering the calcined powder to produce a solid electrolyte. The zirconium source for the solid electrolyte may be $ZrO_2$. The dopant for the solid electrolyte may be $Al_2O_3$, $Fe_2O_3$, $Sb_2O_3$, $Yb_2O_3$, or $Dy_2O_3$.

13 Claims, 11 Drawing Sheets

(51) Int. Cl.
  H01M 10/056 (2010.01)
  H01M 10/054 (2010.01)
  C01B 25/45 (2006.01)
  H01M 10/05 (2010.01)
  H01M 10/39 (2006.01)
  H01M 8/124 (2016.01)

(52) U.S. Cl.
  CPC ............ H01M 10/05 (2013.01); H01M 10/39 (2013.01); H01M 2008/1293 (2013.01); H01M 2220/20 (2013.01); H01M 2300/0068 (2013.01); H01M 2300/0071 (2013.01)

(56) References Cited

U.S. PATENT DOCUMENTS

| | | |
|---|---|---|
| 4,587,172 A | 5/1986 | Roy et al. |
| 5,354,722 A | 10/1994 | Agaskar et al. |
| 5,580,430 A | 12/1996 | Balagopal et al. |
| 6,940,628 B2 | 9/2005 | Giron |
| 7,060,205 B2 | 6/2006 | Monden et al. |
| 7,713,466 B2 | 5/2010 | Omori et al. |
| 2007/0138020 A1 | 6/2007 | Balagopal et al. |
| 2008/0138710 A1 | 6/2008 | Liaw et al. |
| 2009/0005824 A1 | 1/2009 | Visco et al. |
| 2010/0331170 A1* | 12/2010 | Balagopal ............... C01B 25/38 501/152 |
| 2011/0104526 A1 | 5/2011 | Boxley et al. |
| 2011/0165471 A9 | 7/2011 | Skotheim et al. |
| 2012/0199785 A1 | 8/2012 | Saka |

OTHER PUBLICATIONS

Bohnke, O., et al., "Conductivity measurements on nasicon and nasicon-modified materials," *Solid State Ionics* 122:127-136, Elsevier B.V., Netherlands (1999).

Ignaszak, A., et al., "Synthesis and properties of Nasicon-type materials," *Thermochimica Acta* 426:7-14, Elsevier B.V., Netherlands (2005).

Von Alpen, U., et al., "Compositional Dependence of the Electrochemical and Structural Parameters in the Nasicon System ($Na_{1+x}Si_xZr_2P_{3-x}O_{12}$)," *Solid State Ionics* 3&4:215-218, North-Holland Publishing Company, Netherlands (1981).

Alpen, U.V., et al., "Phase transition in NASICON ($Na_3Zr_2Si_2PO_{12}$)," *Materials Research Bulletin* 14:1317-1322, Pergamon Press Ltd., England (1979).

Arora, P., and White, R.E., "Capacity Fade Mechanisms and Side Reactions in Lithium-Ion Batteries," *J. Electrochemical Soc.* 145(10):3647-3667, The Electrochemical Society, United States (1998).

Bates, J.B., et al., "5 Volt Plateau in $LiMn_2O_4$ Thin Films," *J. Electrochemical Soc.* 142(9):L149-L151, The Electrochemical Society, United States (1995).

Blyr, A., et al., "Self-Discharge of $LiMn_2O_4$/C Li-Ion Cells in Their Discharged State: Understanding by Means of Three-Electrode Measurements," *J. Electrochemical Soc.* 145(1):194-209, The Electrochemical Society, United States (1998).

Bukun, N.G., "Superionic transitions in NASICON-type solid electrolytes," *Ionics* 2:63-68, Springer-Verlag, Germany (1996).

Ciesla, J.J., "Safety considerations for fabricating lithium battery packs," *J. Power Sources* 18:101-107, Elsevier B.V., Netherlands (1986).

Cvjeticanin, N.D. and Mentus, S., "Conductivity, viscosity and IR spectra of Li, Na and Mg perchlorate solutions in propylene carbonate/water mixed solvents," *Phys. Chem. Chem. Phys.* 1:5157-5161, Royal Society of Chemistry, England (1999).

Feist, T., et al., "The energetics of phase transitions in the system $Na_{1+x}Zr_2Si_xP_{3-x}O_{12}$, $1.9 \leq x \leq 2.5$," *Thermochimica Acta* 106:57-61, Elsevier B.V., Netherlands (1986).

Feltz, A. and Barth, S., "Preparation and conductivity behaviour of $Na_3M^{II}Zr(PO_4)_3$, ea ($M^{II}$:Mn,Mg,Zn)," *Solid State Ionics* 9&10:817-821, Elsevier B.V., Netherlands (1983).

Fergus, J.W., "Ion transport in sodium ion conducting solid electrolytes," *Solid State Ionics* 227:102-112, Elsevier B.V., Netherlands (2012).

Fuentes, R.O., et al., "Synthesis and properties of NASICON prepared from different zirconia-based precursors," *Boletin de la Sociedad Española de Ceramica y Vidrio* 38(6):631-634, Elsevier España, S.L.U., Spain (1999).

Fuentes, R.O., et al., "Processing and electrical properties of NASICON prepared from yttria-doped zirconia precursors," *J. European Ceramic Soc.* 21:737-743, Elsevier Science Ltd., England (2001).

Fuentes, R.O., et al.,"Submicrometric NASICON ceramics with improved electrical conductivity obtained from mechanically activated precursors," *J. European Ceramic Soc.* 25:455-462, Elsevier Science Ltd., England (2005).

Hayashi, A., et al., "Supersonic glass-ceramic electrolytes for room-temperature rechargeable sodium batteries," *Nature Commun.* 3:856:1-5, Macmillan Publishers Ltd., England (May 2012).

Hyung, Y.E., et al., "Flame-retardant additives for lithium-ion batteries," *J. Power Sources* 119:383-387, Elsevier Science B.V., Netherlands (2003).

Lu, X., et al., "Advanced materials for sodium-beta alumina batteries: Status, challenges and perspectives," *J. Power Sources* 195:2431-2442, Elsevier Science B.V., Netherlands (May 2010).

Mazza, D., "Modeling ionic conductivity in NASICON structures," *J. Solid State Chem.* 156(1):154-160, Academic Press, United States (2001).

Miyajima, Y., et al., "Ionic conductivity of NASICON-type $Na_{1+x}M_xZr_{2-x}P_3O_{12}$ (M: Yb, Er, Dy)," *Solid State Ionics* 84:61-64, Elsevier Science B.V., Netherlands (1996).

Miyajima, Y., et al., "Solubility range and ionic conductivity of large trivalent ion doped $Na_{1+x}M_xZr_{2-x}P_3O_{12}$ (M: In, Yb, Er, Y, Dy, Tb, Gd) solid electrolytes," *Solid State Ionics* 124:201-211, Elsevier Science B.V., Netherlands (1999).

Plichta, E.J. and Behl, W.K., "A low-temperature electrolyte for lithium and lithium-ion batteries," *J. Power Sources* 88:192-196, Elsevier Science S.A., Switzerland (2000).

Saito, Y., et al., "Ionic conductivity of NASICON-type conductors $Na_{1.5}M_{0.5}Zr_{1.5(PO4)3}$ $(M:Al^{3+}, Ga^{3+}, Cr^{3+}, Sc^{3+}, Fe^{3+}, In^{3+}, Yb^{3+}, Y^{3+})$," *Solid State Ionics* 58:327-331, Elsevier Science B.V., Netherlands (1992).

Shin, Y. and Manthiram, A., "Influence of the lattice parameter difference between the two cubic phases formed in the 4 V region on the capacity fading of spinel manganese oxides," *Chem. of Materials* 15(15):2954-2961, American Chemical Society, United States (2003).

Smart, M.C., et al., "Irreversible Capacities of Graphite in Low-Temperature Electrolytes for Lithium-Ion Batteries," *J. Electrochemical Soc.* 146(11):3963-3969, The Electrochemical Society, United States (1999).

Takahashi, T., et al., "Solid-state ionics—conductivities of $Na^+$ ion conductors based on NASICON," *Solid State Ionics* 1(3-4):163-175, North-Holland Publishing Co., Netherlands (1980).

Wang, Q., et al., "4-Isopropyl phenyl diphenyl phosphate as flame-retardant additive for lithium-ion battery electrolyte," *Electrochemical and Solid-State Letters* 8(9):A467-A470, The Electrochemical Society, United States (2005).

Xiang, H.F., "Dimethyl methylphosphonate (DMMP) as an efficient flame retardant additive for the lithium-ion battery electrolytes," *J. Power Sources* 173:562-564, Elsevier Science B.V., Netherlands (2007).

Xu, K., "Nonaqueous liquid electrolytes for lithium-based rechargeable batteries," *Chem. Rev.* 104:4303-4417, American Chemical Society, United States (2004).

International Search Report for International Application No. PCT/US13/61660, Alexandria, Virginia, dated Feb. 24, 2014, 5 pages.

* cited by examiner

Figure 5
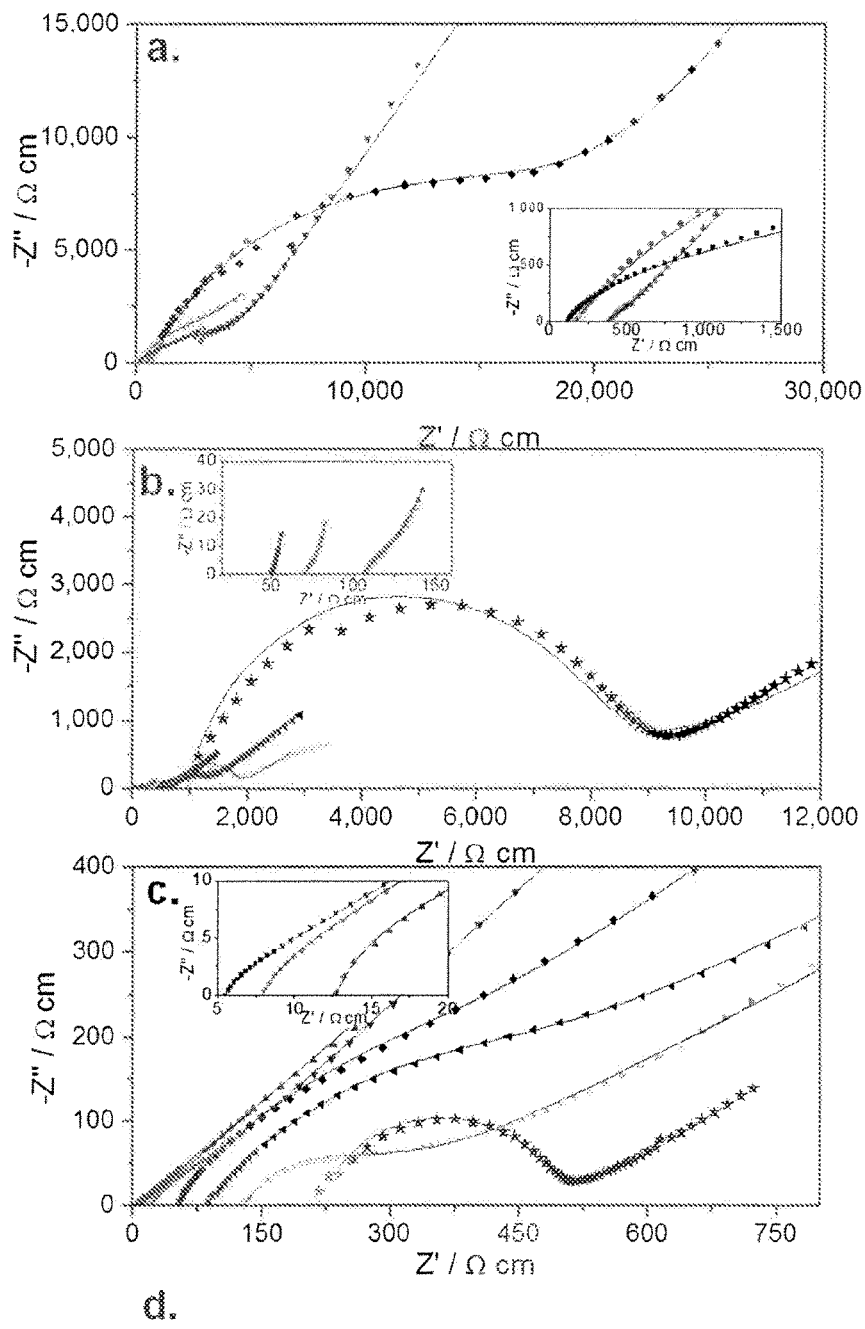
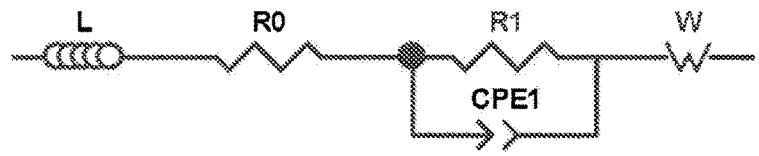

Figure 7
(A) 5% Al-doped NASICON
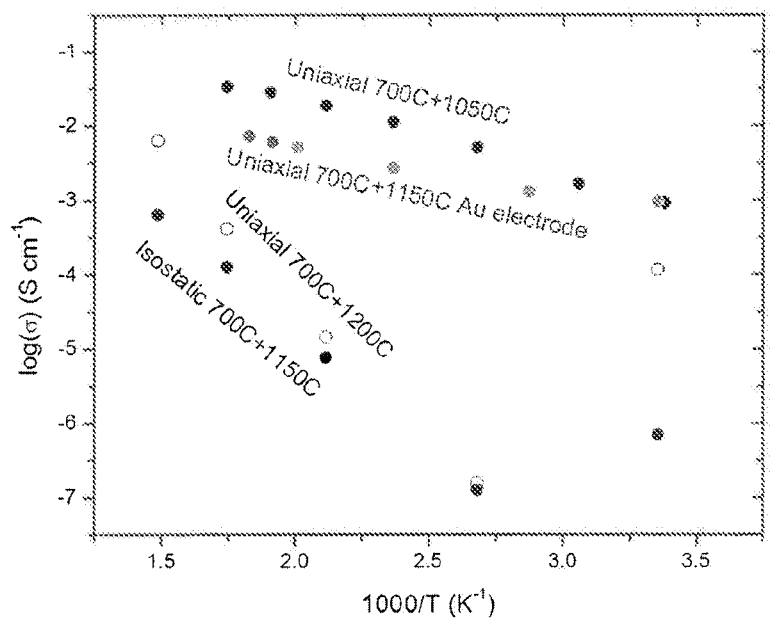
(B) 10% Al-doped NASICON
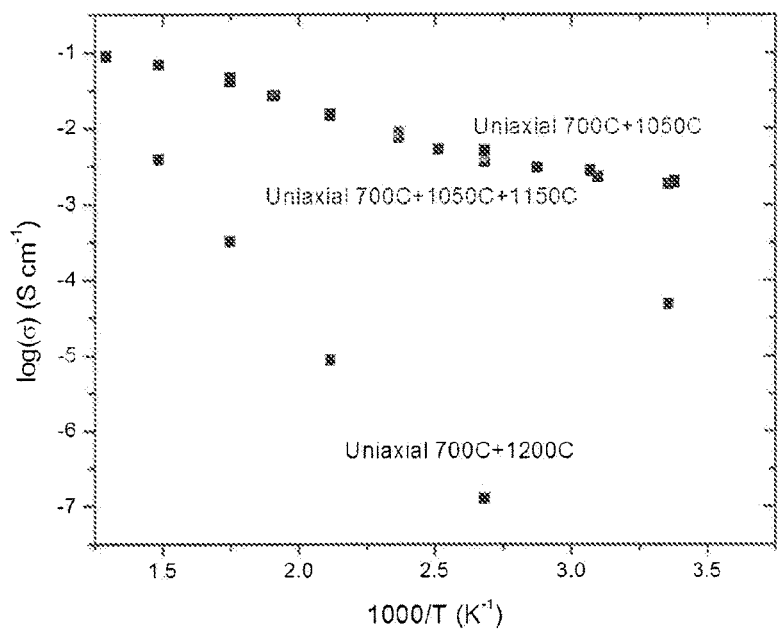

Figure 8
(A) 25% Al-doped NASICON
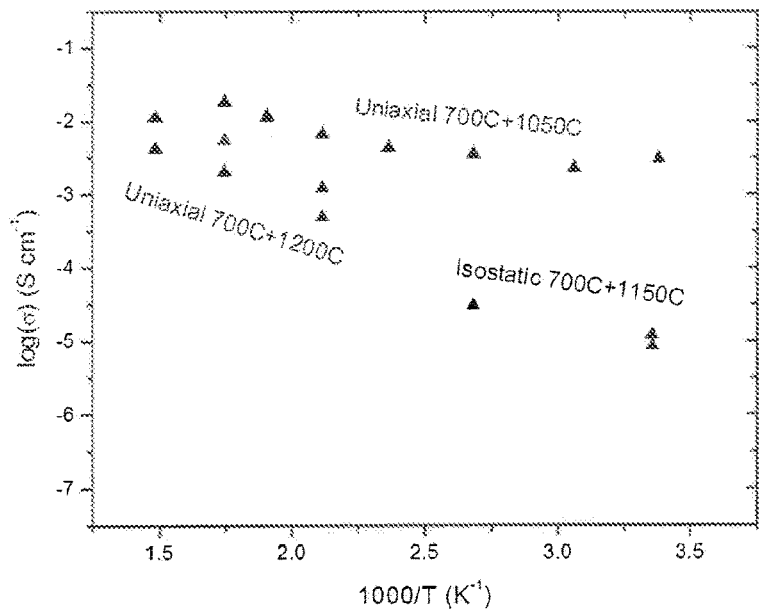
(B) 50% Al-doped NASICON
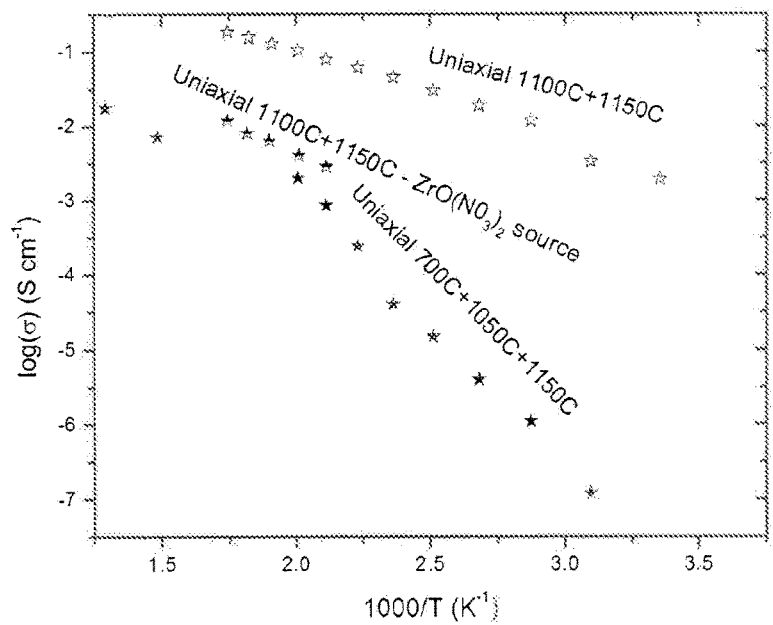

HIGH CONDUCTIVITY NASICON ELECTROLYTE FOR ROOM TEMPERATURE SOLID-STATE SODIUM ION BATTERIES

STATEMENT REGARDING FEDERALLY SPONSORED RESEARCH OR DEVELOPMENT

This invention was made with government support under DEAC0494AL850000 awarded by the Department of Energy. The government has certain rights to this invention.

BACKGROUND OF THE INVENTION

Field of the Invention

The present invention is directed to solid electrolytes, methods of making the solid electrolytes, and methods of using the solid electrolytes in batteries and other electrochemical technologies.

Background

The development of high capacity, high power, and low cost electrochemical batteries will help to catalyze the coming energy revolution. For example, inconsistent production of energy could be averaged over several days or weeks with large, inexpensive batteries. And, vehicles could run on electric motors powered, by energy dense batteries, ultimately drawing their power from the electric grid.

Lithium-ion batteries are some of the best performing and most prevalent batteries today. Unfortunately, they bring with them a host of problems, most notably a limited supply and the high cost of lithium. See "The Trouble with Lithium 2: Under the Microscope," Meridian International Research 2008. Current lithium-ion batteries also entail short cycle-life and dangerous overheating scenarios. See J. J. Ciesla, *J. Power Sources* 18:101-107 (1986). Moreover, conventional lithium-ion batteries suffer drawbacks due to their organic liquid electrolyte, including dissolution of electrodes into the electrolyte and development of a "solid-electrolyte interface" (SEI), which decreases round trip efficiency and greatly shortens cycle life. See Arora, P., et al., *J. Electrochemical Soc.* 145:3647-3667 (1998); Smart, M. C., et al., *J. Electrochemical Soc.* 146:3963-3969 (1999); Blyr, A., et al., *J. Electrochemical Soc.* 145:194-209 (1998); and Y. Shin and A. Manthiram, *Chem. of Materials* 15:2954-2961 (2003). Further, the breakdown voltage of liquid elecrolytes is only 4V, and liquid electrolytes have been shown to out-gas and explode, which limits the operating voltage and temperature of the battery. See M. Na, *Solid State Ionics* 124: 201-211 (1999); Y. Shin and A. Manthiram, *Chem. of Materials* 15:2954-2961 (2003); K. Xu, *Chem. Rev.* 104: 4303-4417 (2004); J. J. Ciesla, *J. Power Sources* 18:101-107 (1986); Wang, Q. S., et al., *Electrochemical and Solid State Letters* 8:A467-A470 (2005), Hyung, Y. E., et al., *J. Power Sources* 119:383-387 (2003); and Xiang, H. F., *J. Power Sources* 173:562-564 (2007).

All-solid-state sodium-ion batteries promise a cheap, safe alternative to current battery chemistries. Solid state ceramic electrolytes show no electrode dissolution or SEI formation, have been shown to be stable beyond 5V (see Hayashi, A., et al., *Nature Commun.* 3:856 (2012) and Bates, J. B., et al., *J. Electrochemical Soc.* 142:L149-L151 (1995)), and are safe to use at very high temperatures due to the intrinsic stability of ceramics. However, the room temperature conductivities of ceramic sodium electrolytes are usually several orders of magnitude lower than their organic counterparts. See J. W. Fergus, *Solid State Ionics* 227:102-112 (2012), E. J. Plichta and W. K. Behl, *J. Power Sources* 88:192-196 (2000), and N. D. Cvjeticanin and S. Mentus, *Phys. Chem. Chem. Phys.* 1:5157-5161 (1999).

If solid-state sodium-ion batteries are to be competitive, they must have high performance at room temperature, thus high conductivity solid electrolytes. Superionic NASICON ($Na^+$ Superionic Conductor), $Na_3Zr_2Si_2PO_{12}$, is one of the most promising and widely studied solid electrolytes. However, the conventional formulation of NASICON provides insufficient performance at room temperature, requiring the use of the higher temperature rhombohedral phase.

Several studies have been published investigating trends in doping effects. See Miyajima, Y., et al., *Solid State Ionics* 124:201-211 (1999); M. Na, *Solid State Ionics* 124:201-211 (1999); Saito, Y., et al., *Solid State Ionics* 58:327-331 (1992); Takahashi, T., et al., *Solid State Ionics* 1:163-175 (1980); A. Feltz and S. Barth, *Solid State Ionics* 9:817-821 (1983); and Miyajima, Y., et al., *Solid State Ionics* 84:61-64 (1996). It has been demonstrated that ionic conductivity increases with transition metal radius doped at the octahedral zirconium site See Saito, Y., et al., *Solid State Ionics* 58:327-331 (1992) and Miyajima, Y., et al., *Solid State Ionics* 84:61-64 (1996). However, the evidence for this trend has been drawn from doping the silicon-free and much less conductive $NaZrP_3O_{12}$ (NZP) compositional end member. Unlike $NaZrP_3O_{12}$ which is stable in the rhombohedral structure at room temperature, $Na_3Zr_2Si_2PO_{12}$ shows a transition to a low temperature monoclinic phase around 175° C. See Alpen, U. V. et al., *Materials Research Bulletin* 14:1317-1322 (1979); Feist, T., et al., *Thermochemica Acta* 106:57-61 (106); and Bukun, N. G., *Ionics* 2:63-68 (1996).

Following this trend to the extreme, Miyajima showed that the largest ion soluble in NZP is dyspropium, after which maximum solid solubility drops to near dilute doping levels. See Miyajima, Y., et al., *Solid State Ionics* 84:61-64 (1996).

No such trend has been discovered in superionic NASICON. Solid solubility in NASICON may not be as tolerant to large radii, as suggested by Takahashi's observation of low yttrium solubility in NASICON despite the largest dysprosium's solubility in NZP. See Takahashi, T., et al., *Solid State Ionics* 1:163-167 (1980).

The present invention provides several NASICON type materials where the metal ion is sodium that have been doped with octahedral site dopants having different ionic radii. Surprisingly, it has been found that a smaller ionic radius trivalent dopant can increase the conductivity of the solid electrolyte.

BRIEF SUMMARY OF THE INVENTION

In some embodiments, the present invention provides a solid electrolyte of formula (I):

$$Na_{3+x}M_xZr_{2-x}Si_2PO_{12} \quad (I)$$

wherein

M is a metal ion selected from the group consisting of $Al^{3+}$, $Fe^{3+}$, $Sb^{3+}$, $Yb^{3+}$, $Dy^{3+}$, or $Er^{3+}$, and x is between 0.01 and 3.

In some embodiments, the solid electrolyte has a x value between 0.8 and 1.2. In some embodiments, the solid electrolyte has an x value between 0.9 and 1.1. In some embodiments, the solid electrolyte has an x value of 1.

In some embodiments, the metal ion in the solid electrolyte is $Al^{3+}$. In some embodiments, the metal ion in the solid electrolyte is $Fe^{3+}$.

In some embodiments, the solid electrolyte is $Na_4ZrAlSi_2PO_{12}$, $Na_4ZrFeSi_2PO_{12}$, $Na_4ZrSbSi_2PO_{12}$, $Na_4ZrYbSi_2PO_{12}$, or $Na_4ZrDySi_2PO_{12}$.

In some embodiments, the solid electrolyte has ionic conductivity at 25° C. between 0.1 and 0.001 S/cm.

In some embodiments, the present inventions provides a method of producing a solid electrolyte comprising:
(a) ball milling $Na_2CO_3$, $SiO_2$, $NH_4H_2PO_4$, a zirconium source, and a dopant to produce a ball milled powder;
(b) calcining the ball milled powder to produce a calcined powder; and
(c) sintering the calcined powder to produce a solid electrolyte.

In some embodiments, the zirconium source for the solid electrolyte is $ZrO_2$.

In some embodiments, the dopant for the solid electrolyte is $Al_2O_3$, $Fe_2O_3$, $Sb_2O_3$, $Yb_2O_3$, or $Dy_2O_3$. In some embodiments, the dopant is $Al_2O_3$. In some embodiments, the dopant is $Fe_2O_3$.

In some embodiments, the method of producing the solid electrolyte comprises calcining the ball milled powder at a temperature between 800° C. and 1200° C. In some embodiments, the method of producing the solid electrolyte comprises calcining the ball milled powder at a temperature between 900° C. and 1100° C.

In some embodiments, the method of producing the solid electrolyte comprises sintering the calcined powder at a temperature between 900° C. and 1400° C. In some embodiments, the method of producing the solid electrolyte comprises sintering the calcined powder at a temperature between 1000° C. and 1300° C.

In some embodiments, the present invention provides a sodium ion battery comprising a solid electrolyte, wherein the solid electrolyte is of formula (I):

$$Na_{3+x}M_xZr_{2-x}Si_2PO_{12} \quad (I)$$

wherein
M is a metal ion selected from the group consisting of $Al^{3+}$, $Fe^{3+}$, $Sb^{3+}$, $Yb^{3+}$, $Dy^{3+}$, or $Er^{3+}$, and
x is between 0.01 and 3.

In some embodiments, the solid electrolyte in the sodium ion battery is $Na_4ZrAlSi_2PO_{12}$, $Na_4ZrFeSi_2PO_{12}$, $Na_4ZrSbSi_2PO_{12}$, $Na_4ZrYbSi_2PO_{12}$, or $Na_4ZrDySi_2PO_{12}$. In some embodiments, the solid electrolyte in the sodium ion battery is $Na_4ZrAlSi_2PO_{12}$.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

FIG. 5 shows Nyquist plots measured from 25° C. to 300° C. for (a) $Na_3Zr_{1.94}Y_{0.06}Si_2PO_{12}$; (b) $Na_4ZrFeSi_2PO_{12}$; (c) $Na_4ZrAlSi_2PO_{12}$. The equivalent circuit used to calculate conductivity for impedance data is shown in (d).

FIG. 7 shows Arrhenius plots (conductivity versus 1/T) for solid electrolytes as a function of $Al^{3+}$ composition and sintering conditions for (A) a solid electrolyte having a 5% $Al^{3+}$ composition; and (B) a solid electrolyte having a 10% $Al^{3+}$ composition.

FIG. 8 shows Arrhenius plots (conductivity versus 1/T) for solid electrolytes as a function of $Al^{3+}$ composition and sintering temperature for (A) a solid electrolyte having a 25% $Al^{3+}$ composition; and (B) a solid electrolyte having a 50% $Al^{3+}$ composition.

DETAILED DESCRIPTION OF THE INVENTION

Figure 1:
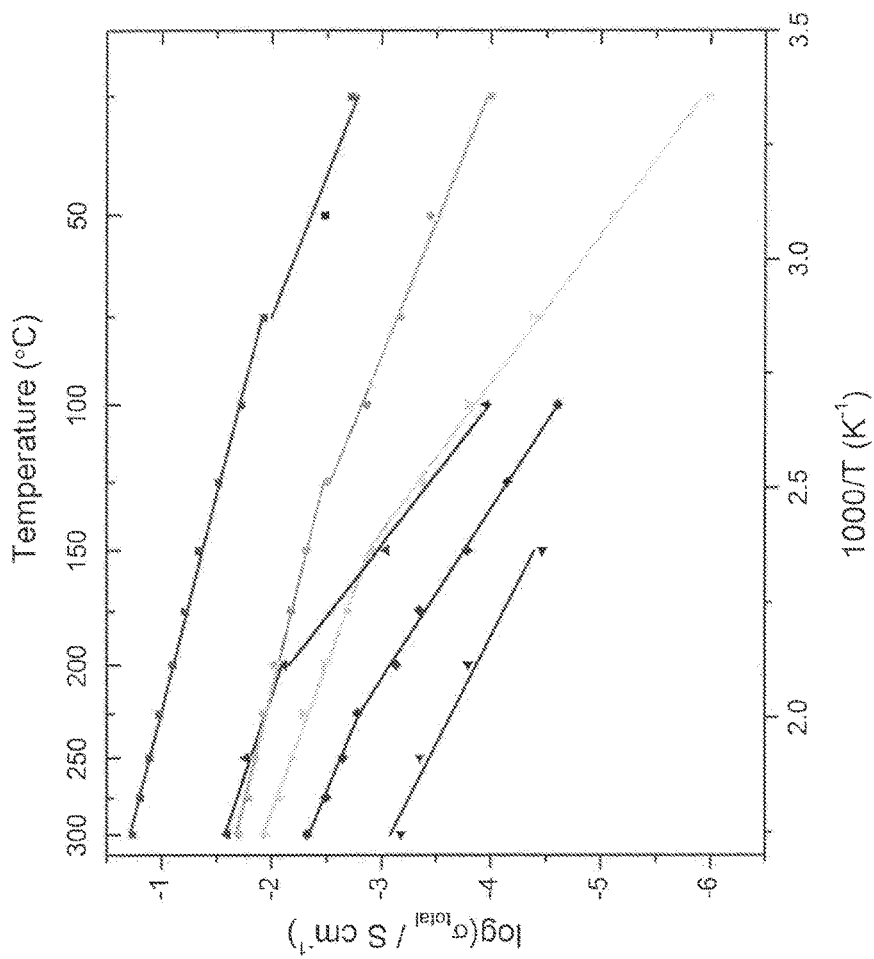
FIG. 1 shows an Arrhenius plot (conductivity versus 1/T) measured at various temperatures for the solid electrolytes $Na_4ZrAlSi_2PO_{12}$ (squares), $Na_4ZrFeSi_2PO_{12}$ (circles), $Na_3Zr_{1.94}Y_{0.06}Si_2PO_{12}$ (upward triangles), $Na_4ZrSbSi_2PO_{12}$, (downward triangles), and $Na_4ZrDySi_2PO_{12}$ (diamonds).

As used herein, the singular terms "a" and "the" are synonymous and used interchangeably with "one or more" and "at least one," unless the, language and/or context clearly indicates otherwise. As used herein, the term "comprising" means including, made up, of, and composed of.

All numbers in this description indicating amounts, ratios of materials, physical properties of materials, and/or use are to be understood as modified by the word "about," except as otherwise explicitly indicated.

The term "about" as used herein includes the recited number±10%. Thus, "about ten" means 9 to 11.

In some embodiments, the present invention provides a solid electrolyte of formula (I):

$$Na_{3+x}M_xZr_{2-x}Si_2PO_{12} \quad (I)$$

wherein
M is a metal ion selected from the group consisting of $Al^{3+}$, $Fe^{3+}$, $Sb^{3+}$, $Yb^{3+}$, $Dy^{3+}$, or $Er^{3+}$, and
x is between 0.01 and 3.

In some embodiments, x is between 0.01 and 3, between 0.01 and 2.5, between 0.01 and 2.0, between 0.01 and 1.5, between 0.01 and 1.3, between 0.01 and 1.2, between 0.01 and 1.1, between 0.01 and 1, between 0.01 and 0.9, between 0.01 and 0.8, between 0.01 and 0.7, between 0.01 and 0.5, between 0.01 and 0.1, between 0.01 and 0.05, between 0.05 and 3, between 0.05 and 2.5, between 0.05 and 2, between 0.05 and 1.5, between 0.05 and 1.3, between 0.05 and 1.2, between 0.05 and 1.1, between 0.05 and 1, between 0.05 and 0.9, between 0.05 and 0.8, between 0.05 and 0.7, between 0.05 and 0.5, between 0.05 and 0.1, between 0.1 and 3, between 0.1 and 2.5, between 0.1 and 2, between 0.1 and 1.5, between 0.1 and 1.3, between 0.1 and 1.2, between 0.1 and 1.1, between 0.1 and 1, between 0.1 and 0.9, between 0.1 and 0.8, between 0.1 and 0.7, between 0.1 and 0.5, between 0.5 and 3, between 0.5 and 2.5, between 0.5 and 2, between 0.5 and 1.5, between 0.5 and 1.3, between 0.5 and 1.2, between 0.5 and 1.1, between 0.5 and 1, between 0.5 and 0.9, between 0.5 and 0.8, between 0.5 and 0.7, between 0.7 and 3, between 0.7 and 2.5, between 0.7 and 2, between 0.7 and 1.5, between 0.7 and 1.3, between 0.7 and 1.2, between 0.7 and 1.1, between 0.7 and 1, between 0.7 and 0.9, between 0.7 and 0.8, between 0.8 and 3, between 0.8 and 2.5, between 0.8 and 2, between 0.8 and 1.5, between 0.8 and 1.3, between 0.8 and 1.2, between 0.8 and 1.1, between 0.8 and 1, between 0.8 and 0.9, between 0.9 and 3, between 0.9 and 2.5, between 0.9 and 2, between 0.9 and 1.5, between 0.9 and 1.3, between 0.9 and 1.2, between 0.9 and 1.1, between 0.9 and 1, between 1 and 3, between 1 and 2.5, between 1 and 2, between 1 and 1.5, between 1 and 1.3, between 1 and 1.2, between 1 and 1.1, between 1.1 and 3, between 1.1 and 2.5, between 1.1 and 2, between 1.1 and 1.5, between 1.1 and 1.3, between 1.1 and 1.2, between 1.2 and 3, between 1.2 and 2.5, between 1.2 and 2, between 1.2 and 1.5, between 1.2 and 1.3, between 1.3 and 3, between 1.3 and 2.5, between 1.3 and 2, between 1.3 and 1.5, between 1.5 and 3, between 1.5 and 2.5, between 1.5 and 2, between 2 and 3, between 2 and 2.5, and between 2.5 and 3. In some embodiments, x is 1.

The measured molar ratios for Na, M, Zr Si, P, and O may differ from the theoretical ratios. The values for x are to be understood as modified by the word "about." Therefore, a value of x=1 is understood to mean x=1±0.1. For example, a value of x=11 is understood to mean 0.9 to 1.1.

In some embodiments, M is a metal ion which is $Al^{3+}$, $Fe^{3+}$, $Sb^{3+}$, $Yb^{3+}$, $Dy^{3+}$, or $Er^{3+}$. In some embodiments, M is a metal ion which is $Al^{3+}$. In some embodiments, M is a metal ion which is $Fe^{3+}$. In some embodiments, M is a metal ion which is $Sb^{3+}$. In some embodiments, M is a metal ion which is $Yb^{3+}$. In some embodiments, M is a metal ion which is $Dy^{3+}$. In some embodiments, M is a metal ion which is $Er^{3+}$.

In some embodiments, the solid electrolyte of the present invention possesses high ion conductivity at temperatures below 300° C., below 200° C., below 150° C., below 100° C., below 90° C., below 80° C., below 70° C., below 60° C., below 50° C., below 40° C., or below 30° C. In some embodiments, the solid electrolytes possess high ion conductivity at temperatures between 28° C. and 18° C., between 28° C. and 19° C., between 28° C. and 20° C., between 28° C. and 21° C., between 28° C. and 22° C., between 28° C. and 23° C., between 28° C. and 24° C., between 28° C. and 25° C., between 28° C. and 26° C., between 28° C. and or 27° C., between 27° C. and 18° C., between 27° C. and 19° C., between 27° C. and 20° C., between 27° C. and 21° C., between 27° C. and 22° C., between 27° C. and 23° C., between 27° C. and 24° C., between 27° C. and 25° C., between 27° C. and 26° C., between 26° C. and 18° C., between 26° C. and 19° C., between 26° C. and 20° C., between 26° C. and 21° C., between 26° C. and 22° C., between 26° C. and 23° C., between 26° C. and 24° C., between 26° C. and 25° C., between 25° C. and 18° C., between 25° C. and 19° C., between 25° C. and 20° C., between 25° C. and 21° C., between 25° C. and 22° C., between 25° C. and 23° C., between 25° C. and 24° C., between 24° C. and 18° C., between 24° C. and 19° C., between 24° C. and 20° C., between 24° C. and 21° C., between 24° C. and 22° C., between 24° C. and 23° C., between 23° C. and 18° C., between 23° C. and 19° C., between 23° C. and 20° C., between 23° C. and 21° C., between 23° C. and 22° C., between 22° C. and 1.8° C., between 22° C. and 19° C., between 22° C. and 20° C., between 22° C. and 21° C., between 21° C. and 18° C., between 21° C. and 19° C., between 21° C. and 20° C., between 20° C. and 18° C., between 20° C. and 19° C., or between 19° C. and 18° C. In some embodiments, the solid electrolyte possesses an ion conductivity between 0.1 and 0.001 S/cm, between 0.1 and 0.002 S/cm, between 0.1 and 0.005 S/cm, between 0.1 and 0.01 S/cm, between 0.1 and 0.015 S/cm, between 0.1 and 0.018 S/cm, between 0.1 and 0.02 S/cm, between 0.1 and 0.025 S/cm, between 0.1 and 0.03 S/cm, between 0.03 and 0.001 S/cm, between 0.03 and 0.002 S/cm, between 0.03 and 0.005 S/cm, between 0.03 and 0.01 S/cm, between 0.03 and 0.015 S/cm, between 0.03 and 0.018 S/cm, between 0.03 and 0.02 S/cm, between 0.03 and 0.025 S/cm, between 0.025 and 0.001 S/cm, between 0.025 and 0.002 S/cm, between 0.025 and 0.005 S/cm, between 0.025 and 0.01 S/cm, between 0.025 and 0.015 S/cm, between 0.025 and 0.018 S/cm, between 0.025 and 0.02 S/cm, between 0.02 and 0.001 S/cm, between 0.02 and 0.005 S/cm, between 0.02 and 0.01 S/cm, between 0.02 and 0.015 S/cm, between 0.02 and 0.018 S/cm, between 0.018 and 0.001 S/cm, between 0.018 and 0.005 S/cm, between 0.018 and 0.01 S/cm, between 0.018 and 0.015 S/cm, between 0.015 and 0.001 S/cm, between 0.015 and 0.005 S/cm, between 0.015 and 0.01 S/cm, between 0.01 and 0.001 S/cm, between 0.01 and 0.005 S/cm, or between 0.005 and 0.001 S/cm. In some embodiments, the solid electrolyte possesses ion conductivity at 25° C. between 0.1 and 0.001 S/cm, between 0.1 and 0.002 S/cm, between 0.1 and 0.005 S/cm, between 0.1 and 0.01 S/cm, between 0.1 and 0.015 S/cm, between 0.1 and 0.018 S/cm, between 0.1 and 0.02 S/cm, between 0.1 and 0.025 S/cm, between 0.1 and 0.03 S/cm, between 0.03 and 0.001 S/cm, between 0.03 and 0.002 S/cm, between 0.03 and 0.005 S/cm, between 0.03 and 0.01 S/cm, between 0.03 and 0.015 S/cm, between 0.03 and 0.018 S/cm, between 0.03 and 0.02 S/cm, between 0.03 and 0.025 S/cm, between 0.025 and 0.001 S/cm, between 0.025 and 0.002 S/cm, between 0.025 and 0.005 S/cm, between 0.025 and 0.01 S/cm, between 0.025 and 0.015 S/cm, between 0.025 and 0.018 S/cm, between 0.025 and 0.02 S/cm, between 0.02 and 0.001 S/cm, between 0.02 and 0.005 S/cm, between 0.02 and 0.01 S/cm, between 0.02 and 0.015 S/cm, between 0.02 and 0.018 S/cm, between 0.018 and 0.001 S/cm, between 0.018 and 0.005 S/cm, between 0.018 and 0101 S/cm, between 0.018 and 0.015 S/cm, between 0.015 and 0.001 S/cm, between 0.015 and 0.005 S/cm, between 0.015 and 0.01 S/cm, between 0.01 and 0.001 S/cm, between 0.01 and 0.005 S/cm, or between 0.005 and 0.001 S/cm.

In some embodiments, the solid electrolyte disclosed herein may be used or produced in any suitable form as would be understood by one of ordinary skill in the art. In some embodiments, the form of the solid electrolyte may be a membrane and may include at least one of the following: monolithic flat plate geometries, supported structures in flat plate geometries, monolithic tubular geometries, supported structures in tubular geometries, monolithic honeycomb geometries, or supported structures in honeycomb geometries.

In some embodiments, the solid electrolyte membranes may be composites of solid electrolytes with non-conductive materials, where the non-conductive materials are poor ionic and electronic electrical conductors under the conditions of use. A variety of insulative non-conductive materials are also known in the art, as would be understood by one of ordinary skill in the art. In some specific embodiments, the non-conductive materials may include at least one of the following: ceramic materials, polymers, and/or plastics that are substantially stable in the media to which they are exposed.

Layered solid electrolyte-polymer composite membranes are also particularly suitable for use as alkali-ion conducting ceramic membranes in the present invention. Layered alkali-ion conducting material-polymer composite membranes generally comprise ion-selective polymers layered on solid electrolytes. Ion-selective polymer materials have the disadvantage of having poor selectively to sodium ions, yet they demonstrate the advantage of high chemical stability.

In some specific embodiments, the solid electrolyte membrane may comprise two or more co-joined layers of different solid electrolytes. Such co-joined solid electrolyte membrane layers could include solid electrolytes disclosed herein joined to other solid electrolytes, such as, but not limited to, β-alumina. Such co-joined layers could be joined to each other using a method such as, but not limited to, thermal spraying, plasma spraying, co-firing, joining following sintering, etc. Other suitable joining, methods are known by one of ordinary skill in the art and are included herein.

One of ordinary skill in the art would understand, that a number of processing methods are known for processing the solid electrolytes such as high temperature solid-state reaction processes, co-precipitation processes, hydrothermal processes, or sol-gel processes. In some embodiments, it may be advantageous to synthesize the solid electrolytes by high temperature solid-state reaction processes. In some embodiments, the solid electrolytes may be systematically synthesized by solid-state mixing techniques. A mixture of the starting materials may be mixed in an organic solvent, and, the mixture of starting materials dried to evolve the organic solvent. In some embodiments, the organic solvent is ethanol or methanol. In some embodiments, the drying is at a temperature greater than 50° C., greater than 70° C., greater than 90° C., greater than 100° C., greater than 150° C., or greater than 200° C.

In some embodiments, the mixture of starting materials is ball milled. In some least 1 hour, at least 5 hours, at least 10 hours, at least 15 hours, at least 20 hours, at least 24 hours, at least 30, or at least 50 hours.

In some embodiments, the ball milled mixture is calcined. In some embodiments, the ball milled mixture is calcined at a temperature between 500° C. and 2000° C., between 500° C. and 1500° C., between 500° C. and 1400° C., between 500° C. and 1300° C., between 500° C. and 1200° C., between 500° C. and 1100° C., between 500° C. and 1000° C., between 500° C. and 900° C., between 500° C. and 800° C., between 800° C. and 2000° C., between 800° C. and 1500° C., between 800° C. and 1400° C., between 800° C. and 1300° C., between 800° C. and 1200° C., between 800° C. and 1100° C., between 800° C. and 1000° C., between 800° C. and 900° C., between 900° C. and 2000° C., between 900° C. and 1500° C., between 900° C. and 1400° C., between 900° C. and 1300° C., between 900° C. and 1200° C., between 900° C. and 1100° C., between 900° C. and 1000° C., between 1000° C. and 2000° C., between 1000° C. and 1500° C., between 1000° C. and 1400° C., between 1000° C. and 1300° C., between 1000° C. and 1200° C., between 1000° C. and 1100° C., between 1100° C. and 2000° C., between 1100° C. and 1500° C., between 1100° C. and 1400° C., between 1100° C. and 1300° C., between 1100° C. and 1200° C., between 1200° C. and 2000° C., between 1200° C. and 1500° C., between 1200° C. and 1400° C., between 1200° C. and 1300° C., between 1300° C. and 2000° C., between 1300° C. and 1500° C., between 1300° C. and 1400° C., between 1400° C. and 2000° C., between 1400° C. and 1500° C., or between 1500° C. and 2000° C.

In some embodiments, the ball milled mixture is calcined, for at least 30 minutes, at least 1 hour, at least 5 hours, at least 10 hours, at least 15 hours, at least 20 hours, at least 24 hours, at least 30, or at least 50 hours.

In some embodiments, the calcined mixture is milled with media such as stabilized-zirconia or alumina or another media known to one of ordinary skill in the art to achieve the prerequisite particle size distribution. To achieve the prerequisite particle size distribution, the calcined mixture may be milled using a technique such as vibratory milling, attrition milling, jet milling, ball milling, or another technique known to one of ordinary skill in the art, using media such as stabilized-zirconia, alumina, of another media known to one of ordinary skill in the art.

One of ordinary skill in the art would understand that a number of conventional fabrication processing methods are known for processing membranes such as those set forth above in a green-form. Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol gel processing. The resulting green-form membrane may then be sintered to form an alkali cation-conductive membrane using a technique known to one of ordinary skill in the art, such as conventional thermal processing in air, or controlled atmospheres to minimize loss of individual components of the alkali cation-conductive membranes. In some embodiments of the present invention it may be advantageous to fabricate the ceramic membrane in a green-form by die-pressing, optionally followed by isostatic pressing. In other embodiments of the present invention it may potentially be advantageous to fabricate the ceramic membrane as a multi-channel device in a green-form using a combination of techniques such as tape casting, punching, laser-cutting, solvent bonding, heat lamination, or other techniques known to one of ordinary skill in the art.

In some embodiments, the calcined mixture is sintered. In some embodiments, the calcined mixture is sintered at a temperature between 500° C. and 2000° C., between 500° C. and 1500° C., between 500° C. and 1400° C., between 500° C. and 1300° C., between 500° C. and 1200° C., between 500° C. and 1100° C., between 500° C. and 1000° C., between 500° C. and 900° C., between 500° C. and 800° C., between 800° C. and 2000° C., between 800° C. and 1500° C., between 800° C. and 1400° C., between 800° C. and 1300° C., between 800° C. and 1200° C., between 800° C. and 1100° C., between 800° C. and 1000° C., between 800° C. and 900° C., between 900° C. and 2000° C., between 900° C. and 1500° C., between 900° C. and 1400° C., between 900° C. and 1300° C., between 900° C. and 1200° C., between 900° C. and 1100° C., between 900° C. and 1000° C., between 1000° C. and 2000° C., between 1000° C. and 1500° C., between 1000° C. and 1400° C., between 1000° C. and 1300° C., between 1000° C. and 1200° C., between 1000° C. and 1100° C., between 1100° C. and 2000° C., between 1100° C. and 1500° C., between 1100° C. and 1400° C., between 1100° C. and 1300° C., between 1100° C. and 1200° C., between 1200° C. and 2000° C., between 1200° C. and 1500° C., between 1200° C. and 1400° C., between 1200° C. and 1300° C., between 1300° C. and 2000° C., between 1300° C. and 1500° C., between 1300° C. and 1400° C., between 1400° C. and 2000° C., between 1400° C. and 1500° C., or between 1500° C. and 2000° C.

In some embodiments, the calcined mixture is sintered for at least 30 minutes, at least 1 hour, at least 5 hours, at least 10 hours, at least 15 hours, at least 20 hours, at least 24 hours, at least 30, or at least 50 hours.

Standard x-ray diffraction analysis techniques may be performed to identify the crystal structure and phase purity of the solid electrolytes in the sintered ceramic membrane.

The solid electrolytes disclosed herein may advantageously be used in electrochemical processes that would benefit from low temperature operation, high selectivity for the metal ions, and good current efficiency. In some embodiments, the solid electrolyte is used in a fuel cell, in a battery, in a gas separation membrane, in a chemical sensor, or in an ionic switch. In some embodiments, the solid electrolyte is used in a battery.

The following examples are illustrative and non-limiting of the nanoparticle arrays, methods of making, and methods of using described herein. Suitable modifications and adaptations of the variety of conditions, formulations and other parameters normally encountered in the field and which are obvious to those skilled in the art in view of this disclosure are within the spirit and scope of the invention.

EXAMPLES

Example 1

$Na_{3+x}Zr_{2-x}M_xSi_2PO_{12}$ (M=$Al^{3+}$, $Fe^{3+}$, $Sb^{3+}$, $Yb^{3+}$, and $Dy^{3+}$) was synthesized with a conventional solid state reaction for the compositions x=0 (undoped) and x=1 (doped). The starting materials used were $Na_2CO_3$ (99.95-100.05%, Sigma Aldrich, St. Louis, Mo.), amorphous $SiO_2$ (99.80%, Sigma Aldrich, St. Louis, Mo.), and $NH_4H_2PO_4$ (99.999%, Sigma Aldrich, St. Louis, Mo.). The octahedral site dopant was introduced by adding nanocrystalline $ZrO_2$ with $Al_2O_3$, $Fe_2O_3$, $Sb_2O_3$, $Yb_2O_3$, or $Dy_2O_3$ powders in the initial composition $Na_4ZrMSi_2PO_{12}$ wherein M=Al, Fe, Sb, Yb, or Dy. For reference samples, 3% yttria-doped tetragonal zirconia polycrystal (TZ-3Y, Tosoh Corporation, Farmingdale, N.Y.) was used as the zirconium source. It has been shown that TZ-3Y produces a more pure NASICON phase. See Fuentes, R., et al., *Boletin-Sociedad Espanola de Ceramica y Vidrio* 38:631-634 (1999); Fuentes, R., et al., *J. European Ceramic Soc.* 21:737-743 (2001); and Fuentes, R. O., et al., *J. European Ceramic Soc.* 25:455-462 (2005).

The starting materials were mixed in stoichiometric proportions and ball milled overnight (24 hours) in ethanol. After drying at 100° C., the material was calcined for 8 hours in an alumina crucible at temperatures given in Table 1. The calcined powder was again ball milled overnight then dried at 100° C. Sample powder was pressed uniaxially into a pellet with a pressure of 200 mPa in an 8 mm diameter steel die and was sintered for 16 hours in an alumina crucible at temperatures given in Table 1.

TABLE 1

Calcining and Sintering Temperatures for NASICON samples

| Material | Calcining Temperature (° C.) | Sintering Temperature (° C.) |
|---|---|---|
| $Na_3Zr_{1.94}Y_{0.06}Si_2PO_{12}$ | 1100 | 1230 |
| $Na_4ZrAlSi_2PO_{12}$ | 1100 | 1150 |
| $Na_4ZrFeSi_2PO_{12}$ | 900 | 1150 |
| $Na_4ZrSbSi_2PO_{12}$ | 900 | 1050 |
| $Na_4ZrYbSi_2PO_{12}$ | 1100 | 1150 |
| $Na_4ZrDySi_2PO_{12}$ | 1100 | 1150 |

X-ray diffraction (XRD) patterns of sintered and ground pellets were collected at room temperature using a Bruker D8 Advance diffractometer (Bruker Corporation, Madison, Wis.) with CuKα radiation and Lynx Eye detector. Patterns were recorded between 10° C. and 60° C. (2θ) with a 0.015° step size and 0.5 second count time Quantitative elemental analysis of $Na_4ZrAlSi_2PO_{12}$ was conducted by energy-dispersive X-ray spectroscopy (EDS) using a Hitachi SU-70 (Hitachi High Technologies, Dallas, Tex.) scanning electron microscope (SEM) and the results are shown in Table 2.

TABLE 2

Quantitative elemental analysis by EDS of $Na_4ZrAlSi_2PO_{12}$.

| Element | Series | Weight (wt %) | Atom (at. %) | Normalized (at. %) | Error |
|---|---|---|---|---|---|
| C | K | 6.87 | 11.56 | 3.62 | 0.9 |
| O | K | 48.26 | 60.94 | 19.1 | 5.3 |
| Na | K | 14.52 | 12.76 | 4 | 0.9 |
| Al | K | 4.39 | 3.29 | 1.03 | 0.2 |
| Si | K | 7.71 | 5.55 | 1.74 | 0.3 |
| P | K | 4.3 | 2.81 | 0.88 | 0.2 |
| Zr | L | 13.94 | 3.09 | 0.97 | 0.6 |

Figure 4:
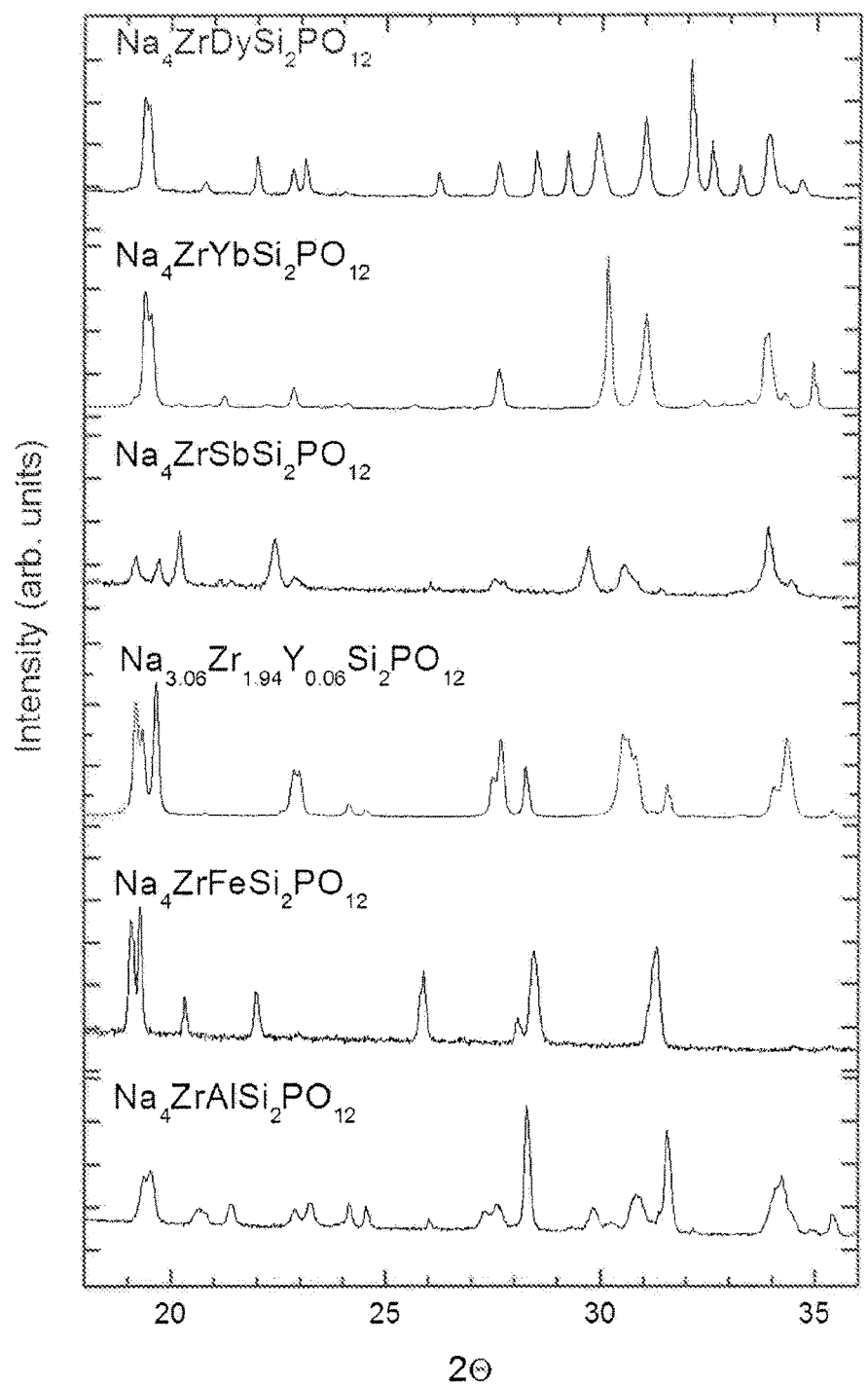
FIG. 4 shows X-ray diffraction data for the solid electrolytes $Na_4ZrDySi_2PO_{12}$, $Na_4ZrYbSi_2PO_{12}$, $Na_4ZrSbSi_2PO_{12}$, $Na_3Zr_{1.94}Y_{0.06}Si_2PO_{12}$, $Na_4ZrFeSi_2PO_{12}$, and $Na_4ZrAlSi_2PO_{12}$.

FIG. 4 shows room temperature X-ray diffraction patterns for $Na_4ZrAlSi_2PO_{12}$, $Na_4ZrFeSi_2PO_{12}$, and $Na_3Zr_{1.94}Y_{0.06}Si_2PO_{12}$, (as a reference) synthesized by solid state reaction. Although there are some impurity peaks, X-ray diffraction pattern indexing reveals that all of these samples belong, to the monoclinic symmetry (space group C2/c), low temperature NASICON phase. After sintering, densities of all samples estimated by Archimedes' principal were over 90% of theoretical, though the ideal sintering temperature was lower with the doped NASICONs (1150° C. versus 1230° C.) as shown in Table 1. In addition, energy dispersive X-ray spectroscopy (EDS) of $Na_4ZrAlSi_2PO_{12}$ confirmed that all the components (i.e., Na, Zr, Si, P, and Al) have the desired stoichiometry as shown in Table 2. The measured molar ratios of Al, Zr, and Na are 1.03:0.97:4, which is very close to the theoretical value (1:1:4).

Electrochemical characterizations were made with pressed and sintered samples. Electrodes were coated on opposite pellet faces with silver paste and heated at 750° C. for 1 hour in air. Silver mesh was attached to platinum leads embedded in the silver paste prior to sintering.

Impedance was measured with a Solartron 1260 from 10 Hz to 30 MHz between room temperature and 300° C. in ambient air. Total conductivity was investigated by electrochemical impedance spectroscopy. FIG. 5 shows the resultant Nyquist plots for (a) $Na_3Zr_{1.94}Y_{0.06}Si_2PO_{12}$, (b) $Na_4ZrFeSi_2PO_{12}$, and (c) $Na_4ZrAlSi_2PO_{12}$ at temperatures from 25-300° C. The spectra were deconvulated with Z-plot software (Scribner Z-Plot) using a simple equivalent circuit as shown in (d) of FIG. 5. In this circuit, L, $R_0$, $R_1$, $CPE_1$, and W represent inductance, bulk resistance, grain boundary resistance, constant phase element, and Warburg element for the electrode, respectively. For grain boundary resistance ($R_1$), the arcs are clearly shown at low temperature range (e.g, <75° C.) but disappeared at high temperature range (e.g., >75° C.). thus, at high temperatures, the grain boundary resistance is suppressed by the high frequency intercept. The fitting cures are overlapped with experimental data in (a)-(c) of FIG. 5. From the fitting results, the total conductivity was calculated by the sum of bulk and grain boundary resistances ($R_0+R_1$) normalized for sample geometry.

Figure 6:
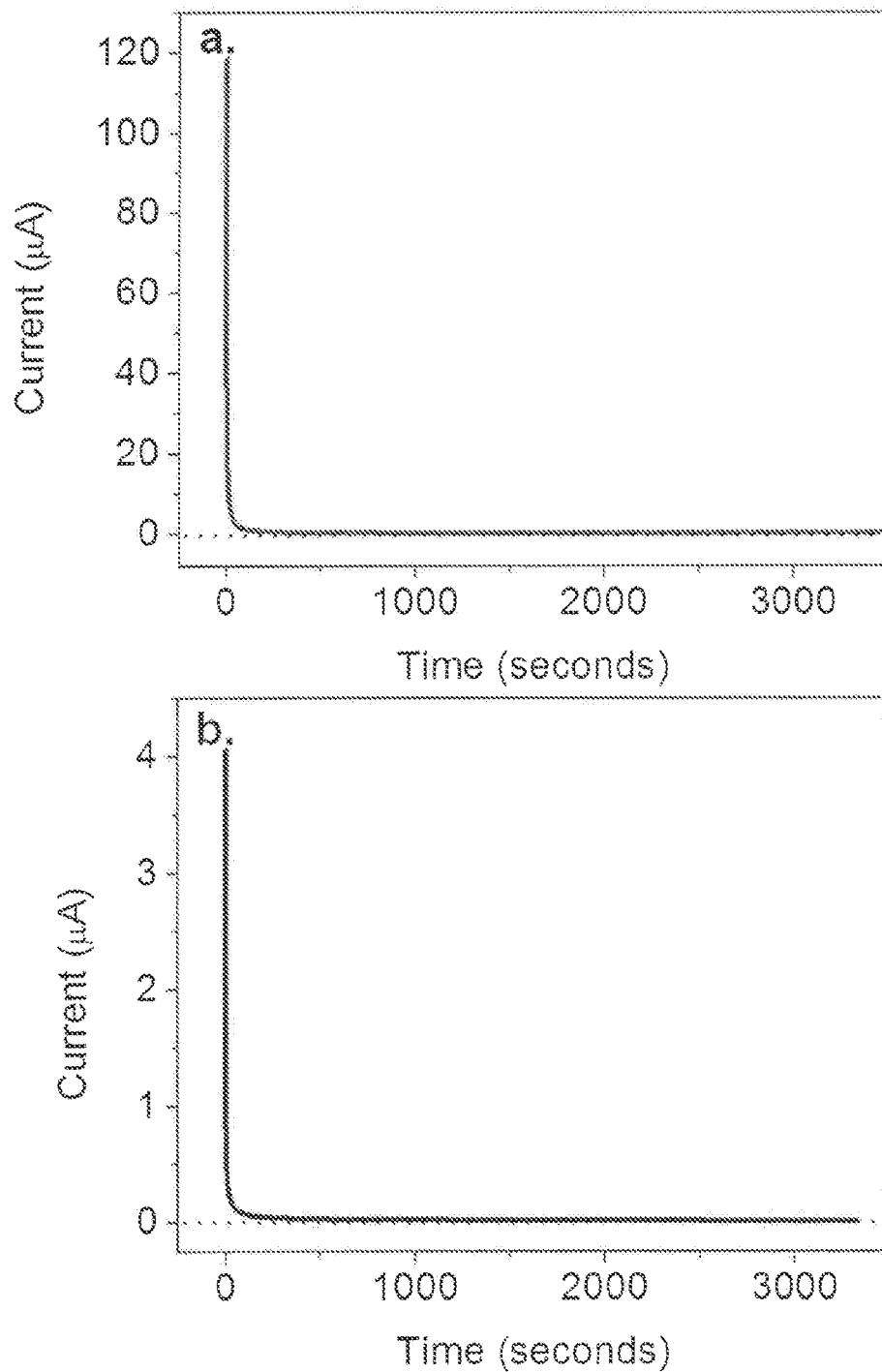
FIG. 6 shows graphs of DC polarization results of current versus time for (a) $Na_4ZrAlSi_2PO_{12}$ and (b) $Na_4ZrFeSi_2PO_{12}$. The shape of the decay curve indicates that the solid electrolytes are pure ionic conductors.
Figure 9:
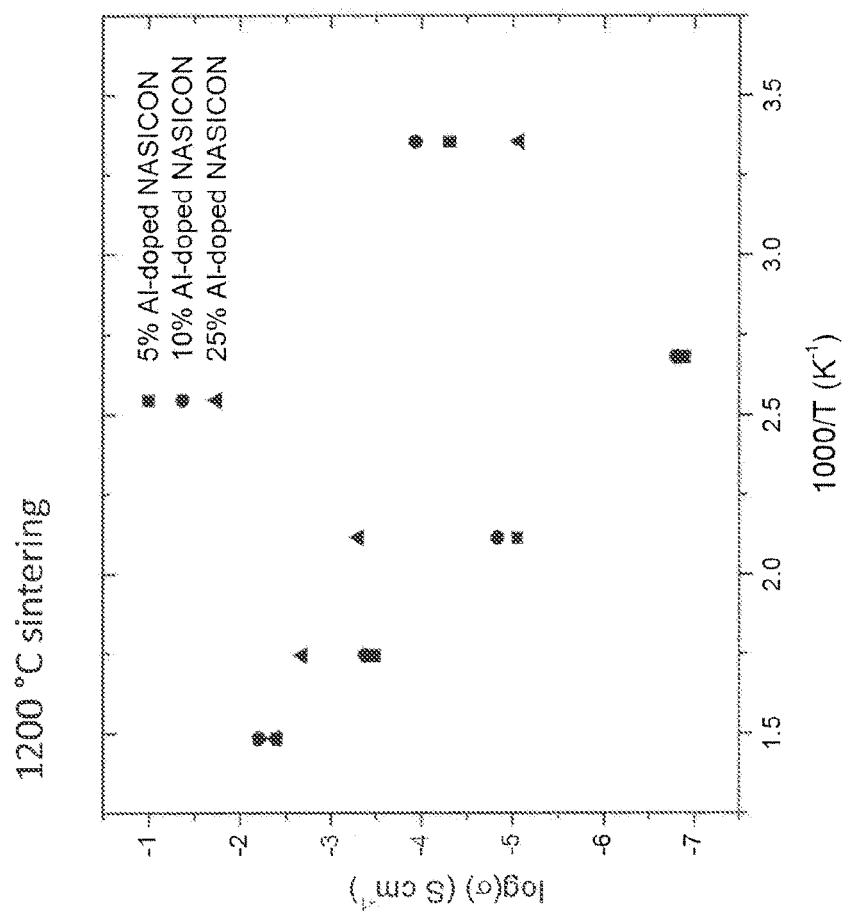
FIG. 9 shows an Arrhenius plot (conductivity versus 1/T) for solid electrolytes as a function of $Al^{3+}$ composition at a sintering temperature of 1200° C.
Figure 10:
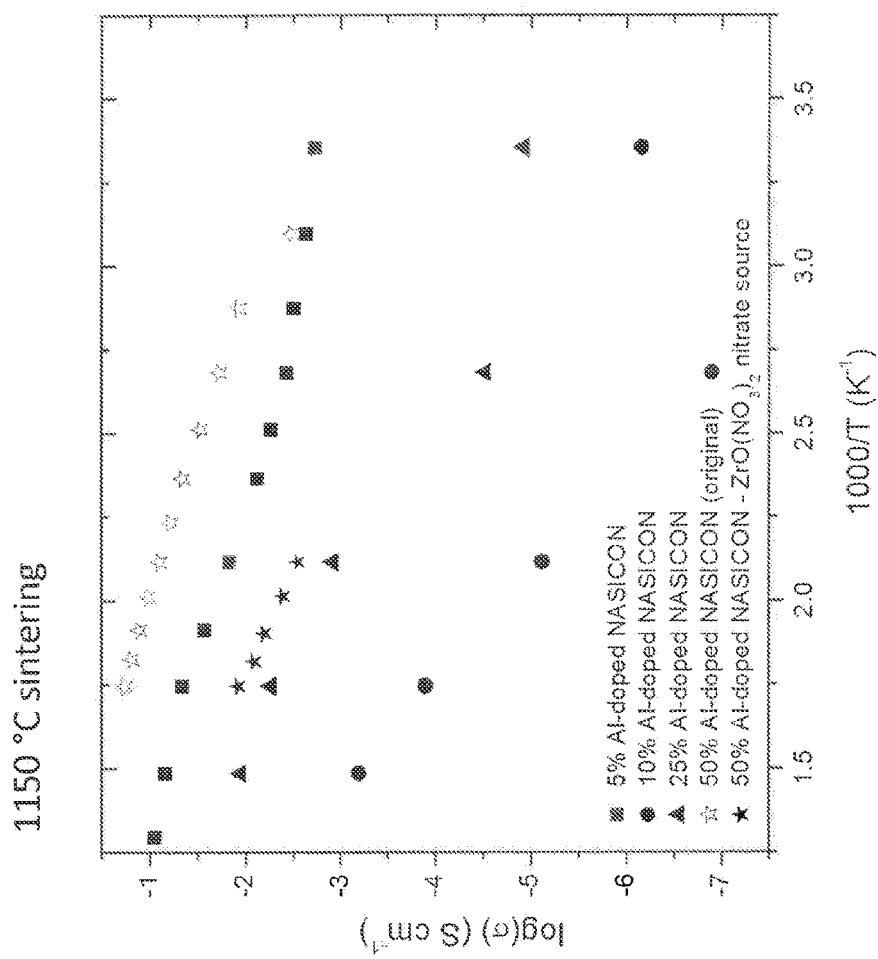
FIG. 10 shows an Arrhenius plot (conductivity versus 1/T) for solid electrolytes as a function of $Al^{3+}$ composition at a sintering temperature of 1150° C.
Figure 11:
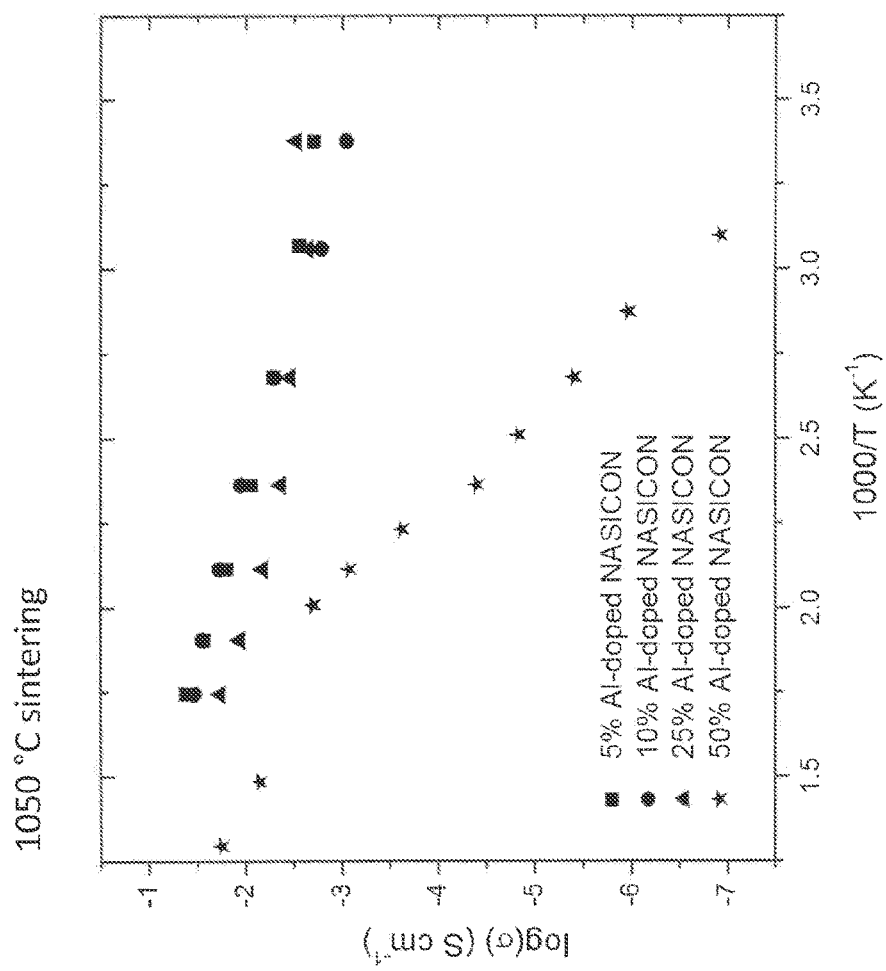
FIG. 11 shows an Arrhenius plot (conductivity versus 1/T) for solid electrolytes as a function of $Al^{3+}$ composition at a sintering temperature of 1050° C.

In addition, the ionic transport number of doped solid electrolytes was measured using 2 point DC conductivity measurement in the temperature range 25-300° C. The results for the Fe- and Al-doped solid electrolytes at 25° C. are shown in FIG. 6. The sharp current drop upon initial polarization shows the electronic conductivities of both doped solid electrolytes are negligible at all measured temperatures. For instance, the electronic conductivities of $Na_4ZrAlSi_2PO_{12}$ were $4.58 \times 10^{-6}$ and $1.37 \times 10^{-4}$ S/cm at 25 and 300° C., respectively, while the ionic conductivities of the same sample were $1.90 \times 10^{-3}$ and $1.82 \times 10^{-1}$ S/cm at 25 and 300° C., respectively, resulting in ionic transport numbers of >0.999. Thus, demonstrating total conductivity values from AC impedance spectroscopy of doped solid electrolyte samples are attributable to $Na^+$, and not electronic, conductivity.

The ionic conductivity as a function of inverse temperature for the solid electrolyte samples with trivalent dopants (of radius): Al(54 pm), Fe(65 pm), Sb(76 pm) and Dy(91 pm); and the conventional solid electrolyte (Zr(72 pm)) are shown in FIG. 1. The ionic conductivity for all samples exhibit a change in $E_A$, with a lower $E_A$ above and a higher $E_A$ below the transition temperature. This change in conductivity $E_A$ is typical of NASICON and usually attributed to a phase transition from the rhombohedral (high temperature) to the monoclinic (low temperature) structure. See Feist, T., et al., *Thermochemica Acta* 106:57-61 (1986).

Figure 2:
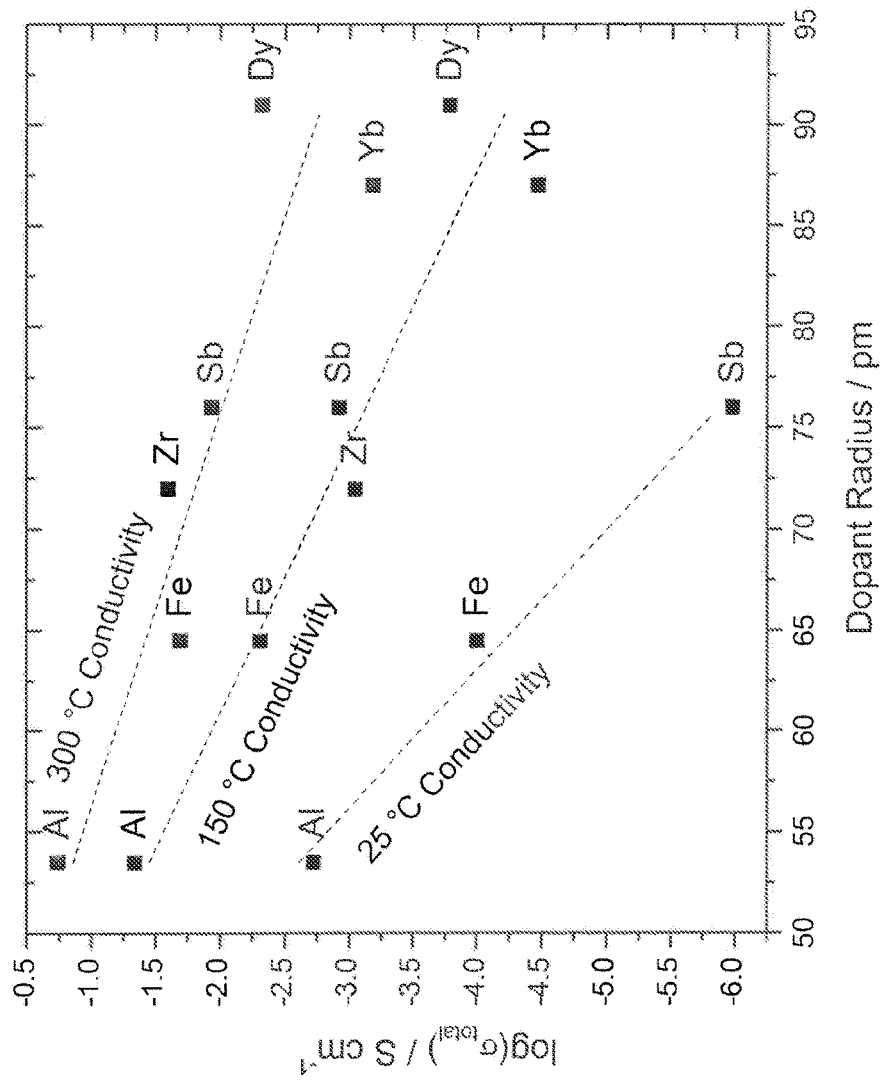
FIG. 2 is a graph of the conductivity versus ionic radius of various doped solid electrolytes measured at 25° C., 150° C., and 300° C. The increase in conductivity due to ionic radius is stronger at lower temperatures as shown by the increasing slope of best fit lines at 25° C., 150° C., and 300° C.
Figure 3:
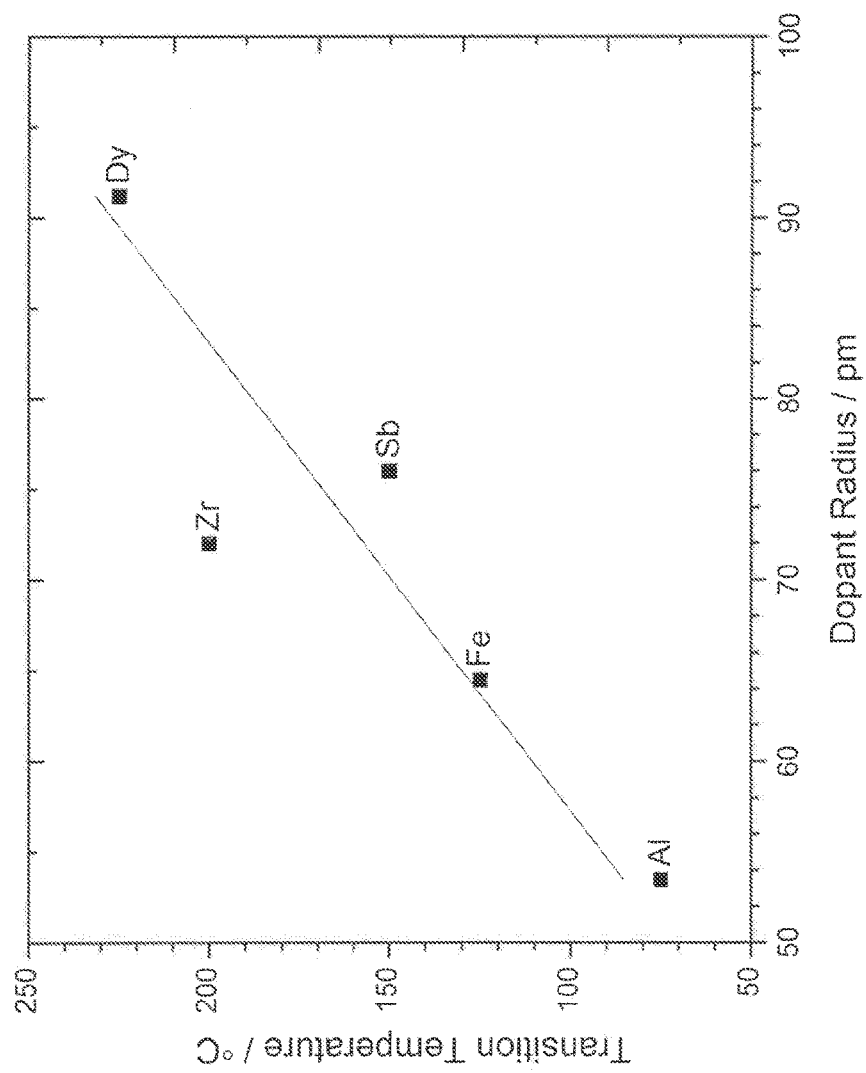
FIG. 3 is graph of the transition temperature° C. versus ionic radius of various doped solid electrolytes measured at 25° C. Solid electrolytes with a smaller ionic radius trivalent dopant show an increased conductivity.

The conductivity-$E_A$ transition temperature dependence on ionic radii is shown in FIG. 2. The conductivity transition temperature decreases linearly with decreasing dopant radii. The transition temperature of the solid electrolyte with Al doping (75° C.) is ~150° C. less than with Dy (225° C.), and ~125° C. less than the reference Zr (~200° C.). Moreover, this indicates a potential approach to stabilize the more conductive rhombohedral phase down to room temperature.

Further, the conductivity increases significantly with decreasing dopant radii. FIG. 2 plots the dependence of conductivity radius for three isotherms: 300, 150, and 25° C. Due to the shift in transition temperature, the dependence of conductivity on dopant radius is stronger at lower temperatures, producing a steeper slope. Thus, $Na_4ZrAlSi_2PO_{12}$ with the smallest dopant shows dramatically improved conductivity at all measured temperatures by 10-100 times compared to the conventional NASICON ($Na_3Zr_{1.94}Y_{0.06}Si_2PO_{12}$) (e.g., $1.88 \times 10^{-2}$ vs $1.11 \times 10^{-4}$ S/cm at 100° C.). Charge balance with the lower valent dopants provides for more $Na^+$ in the lattice compared to the higher valence host ($Na_4ZrAlSi_2PO_{12}$ vs. $Na_3Zr_2Si_2PO_{12}$). Therefore, the superior $Na^+$ conductivity of Al-doped NASICON might be attributed to a synergetic effect of both transition temperature shift and enhanced $Na^+$ transport along with an increase in carrier density. Indeed, the fact that Zr fits the conductivity to dopant radii trends (FIG. 2) so well is surprising given that Zr is tetravalent while the dopants are all trivalent. These results imply that the octahedral site dopant in the NASICON structure plays an important role in determining both the phase transition temperature and controlling the $Na^+$ transport mechanism, thus tailoring $Na^+$ conductivity.

This higher $Na^+$ conductivity with smaller radius dopants can be explained in terms of modification of the ionic conduction pathways. One of the main conduction pathways in monoclinic NASICON is based on a study by Mazza. See D. Mazza, *J. Solid State Chem.* 156:154-160 (2001). In this ionic conduction pathway, which has a larger radius than that of $Na^+$, hopping occurs from one $Na^+[1]$ site to a $Na^+[2]$ site through alternating silicate or phosphate tetrahedra and transition metal octahedra.

When smaller radii $Al^{3+}$ are substituted into octahedral $Zr^{4+}$ sites, the decreased bonding distance between the metal ion and its associated oxygen ions will shrink the size of the octahedra. If this reduction in octahedra size were to reduce lattice, parameter/volume the radii, of the conduction pathway would also decrease corresponding to an expected decrease in conductivity. However, XRD results reveal a more complicated shift in lattice parameters, with a and c increasing while b decreases with decreasing dopant radii (FIG. 2). Moreover, the resulting unit cell volume increases with smaller dopant radius. This implies there is an accommodating expansion of adjacent tetrahedral sites, by extended Si—O or P—O bonding lengths, resulting in a more open local structure for $Na^+$ conduction path.

The Al-doped solid electrolyte has superior conductivity to most other solid $Na^+$ and electrolytes, and similar conductivity to the highest reported values of polycrystalline Na-β-alumina and $Na_3Zr_{1.94}Y_{0.06}Si_2O_{12}$. It should be noted that single crystal Na-β-alumina has 1-2 orders of magnitude higher conductivity than the polycrystalline form, but with limited practical applications due to its anisotropic nature, See Lu, X. C., et al., *J. Power Sources* 195:2431-2442 (2010).

The enhancement of the $Na^+$ conductivity of NASICON type solid electrolytes with smaller radius trivalent dopants in the octahedral site results in a novel solid electrolyte, $Na_4ZrAlSi_2PO_{12}$. Room temperature $Na^+$ conductivities of $1.9 \times 10^{-3}$ S/cm are comparable to those of organic liquid electrolytes, thus opening the door for truly high performance, inexpensive all-solid-state $Na^+$ batteries.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

What is claimed is:
1. A solid electrolyte of formula (I):

$$Na_{3+x}M_xZr_{2-x}Si_2PO_{12} \qquad (I)$$

wherein
M is a metal ion selected from the group consisting of $Sb^{3+}$, $Dy^{3+}$, and $Er^{3+}$, and
x is between 0.01 and 2.
2. The solid electrolyte of claim 1, wherein x is between 0.8 and 1.2.

3. The solid electrolyte of claim 1, wherein x is between 0.9 and 1.1.

4. The solid electrolyte of claim 1, wherein x is 1.

5. The solid electrolyte of claim 1, wherein the solid electrolyte of formula (I) is selected from the group consisting of:

$Na_4ZrSbSi_2PO_{12}$; and $Na_4ZrDySi_2PO_{12}$.

6. The solid electrolyte of claim 1, wherein the ionic conductivity at 25° C. is between 0.1 and 0.001 S/cm.

7. A method of producing the solid electrolyte of claim 1 comprising:
   (a) ball milling $Na_2CO_3$, $SiO_2$, $NH_4H_2PO_4$, a zirconium source, and a dopant to produce a ball milled powder;
   (b) calcining the ball milled powder to produce a calcined powder; and
   (c) sintering the calcined powder to produce the solid electrolyte of claim 1.

8. The method of claim 7, wherein the zirconium source is $ZrO_2$.

9. The method of claim 7, wherein the dopant is selected from the group consisting of $Sb_2O_3$ and $Dy_2O_3$.

10. The method of claim 7, wherein the ball milled powder is calcined at a temperature between 800° C. and 1200° C.

11. The method of claim 7, wherein the ball milled powder is calcined at a temperature between 900° C. and 1100° C.

12. The method of claim 7, wherein the calcined powder is sintered at a temperature between 900° C. and 1400° C.

13. The method of claim 7, wherein the calcined powder is sintered at a temperature between 1000° C. and 1300° C.

* * * * *